US008061858B2

(12) United States Patent
Belliveau et al.

(10) Patent No.: US 8,061,858 B2
(45) Date of Patent: Nov. 22, 2011

(54) LAMP CHANGING SYSTEM FOR AN IMAGE PROJECTION LIGHTING DEVICE

(75) Inventors: Richard S. Belliveau, Austin, TX (US); Keith Dell Bickers, Round Rock, TX (US); Robert T. Smith, Austin, TX (US)

(73) Assignee: Barco Lighting Systems, Inc., Austin, TX (US)

( * ) Notice: Subject to any disclaimer, the term of this patent is extended or adjusted under 35 U.S.C. 154(b) by 530 days.

(21) Appl. No.: 12/117,781

(22) Filed: May 9, 2008

(65) Prior Publication Data
US 2009/0279056 A1 Nov. 12, 2009

(51) Int. Cl.
*G03B 21/14* (2006.01)
*H04N 5/64* (2006.01)
(52) U.S. Cl. ........................................ 353/119; 348/789
(58) Field of Classification Search .................. 353/119, 353/30, 31, 39, 47, 46, 72, 74, 87, 122; 250/239, 250/208.1; 359/475, 477; 348/789, 744, 348/790, 794, 836–839, 843, 844; 349/5, 349/7; 345/905; 312/7.2, 10.1, 270.1, 270.2, 312/270.3, 352; 248/343, 317, 340, 323, 248/318
See application file for complete search history.

(56) References Cited

U.S. PATENT DOCUMENTS

| 5,374,969 | A | * | 12/1994 | Kyhl et al. ..................... 353/119 |
| 5,580,146 | A | * | 12/1996 | Maslow .......................... 353/74 |
| 5,669,688 | A | * | 9/1997 | Baar et al. ..................... 353/119 |
| 6,345,896 | B1 | * | 2/2002 | Kurosawa ....................... 353/119 |
| 6,379,012 | B1 | * | 4/2002 | Enochs et al. .................. 353/79 |
| 6,969,960 | B2 | | 11/2005 | Belliveau ....................... 315/312 |
| 7,144,120 | B2 | * | 12/2006 | Soper et al. ..................... 353/94 |
| 7,481,410 | B2 | * | 1/2009 | Umberg ........................ 248/551 |

OTHER PUBLICATIONS

DL.1 Digital Light "Make the Transition to Digital Lighting!" Brochure, © 2005 High End Systems, Inc.
360° of MultiMedia in Motion DL.2 Digital Light, "See it to Believe it", © 2006 High End Systems, Inc.
"High End Systems 2001 Lighting WorldWide".

* cited by examiner

*Primary Examiner* — Que T Le
*Assistant Examiner* — Jennifer Bennett
(74) *Attorney, Agent, or Firm* — Walter J. Tencza, Jr.

(57) ABSTRACT

An image projection lighting device including a base housing, a yoke, a lamp housing, and a video projector located inside the lamp housing, is disclosed. The video projector includes a video projector housing. The video projector housing can be moved into a first position and a second position in relation to the lamp housing. The first position is a video projector operating position in which the video projector cannot be serviced. The video projector can be serviced in the second position. A projector lamp cannot be accessed in the first position but can be accessed in the second position.

10 Claims, 15 Drawing Sheets

LAMP CHANGING SYSTEM FOR AN IMAGE PROJECTION LIGHTING DEVICE

FIELD OF THE INVENTION

This invention relates to image projection lighting devices.

BACKGROUND OF THE INVENTION

Lighting systems in the prior art are typically formed by interconnecting, via a communications system, a plurality of lighting fixtures and providing for operator control of the plurality of lighting fixtures from a central controller. Such lighting systems may contain multiparameter light fixtures, which illustratively are light fixtures having two or more individually remotely adjustable parameters such as focus, color, image, position, or other light characteristics. Multiparameter light fixtures are widely used in the lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multiparameter light devices are described in the product brochure entitled "The High End Systems Product Line 2001" and are available from High End Systems, Inc. of Austin, Tex. A variety of different types of multiparameter light fixtures are available. One type of advanced multiparameter light fixture is an image projection lighting device ("IPLD").

In the prior art, the "DL2" (trademarked) image projection lighting device has a lamp housing and a projector housing including a projector device. The lamp housing has a back door which can be taken off to access the projector device. The projector device has a back door which can be opened to access a projector lamp. The projector lamp can then be taken out and replaced. However, the projector device used with the DL2 is being discontinued and a different projector device named the "LX650" trademarked or a version of the LX650 will in the future be used with an image projection lighting system. An unmodified version of the LX650 has a filter door which must be opened before a lamp door screw can be accessed. The lamp door screw can then be unfastened and then the lamp door can be opened to take out the projector lamp. However, if the LX650 is placed into a lamp housing similar to the DL2, the entire or nearly the entire LX650 has to be taken out of the lamp housing in order to open the filter door. In the unmodified version of the LX650, after the filter door has been opened, only then can the lamp door be opened to allow access, removal, and replacement of a projector lamp.

In their common application, IPLDs are used to project their images upon a stage or other projection surface. The control of the various parameters of the IPLDs is affected by an operator using a central controller. In a given application, a plurality of IPLDs are used to illuminate the projection surface, with each IPLD having many parameters that may be adjusted by a central controller to create a scene.

IPLDs used in an entertainment lighting system can produce many colorful images upon the stage or projection surface. IPLDs may project images onto the projection surface such as still images, video images and graphic images. The term "content" is a general term that refers to various types of creative works, including image-type works and audio works. Content is typically comprised of still images, video images or loops and computer graphical images.

SUMMARY OF THE INVENTION

In one or more embodiments of the present invention, a projector device, such as the LX650, is modified so that a lamp door can be opened without opening a filter door. In addition, in at least one embodiment of the present invention, an image projection lighting device is provided with a modified lamp housing including a tray device. The tray device allows the LX650 projector device or some other projector device to be slid partially out from the lamp housing in order to access the lamp door of the projector device and thereby the projector lamp in order to replace the projector lamp. This allows the projector device to be supported by the lamp housing, so that it does not have to be inconveniently completely taken out of the lamp housing and so that the filter door does not have to be opened. This also minimizes potential handling damage to the projector when a technician changes a lamp. The lamp housing of the image projection lighting device typically already includes a filter so that the projector device does not need a filter and/or the filter of the projector device does not need to be changed.

In one embodiment of the present invention an image projection lighting device is provided comprising a base housing, a yoke, a lamp housing, and a video projector located inside the lamp housing. The lamp housing is remotely positioned in relation to the base housing by a motor. The video projector may be comprised of a video projector housing, a projector lens, a projector lamp, and a first light valve. The video projector housing can be moved into a first position and a second position in relation to the lamp housing. The first position can be a video projector operating position and the video projector cannot be serviced in the video projector operating position. In at least one embodiment, a projector lamp cannot be serviced in the first position. The video projector can be serviced in the second position. In at least one embodiment the projector lamp can be accessed in the second position.

The lamp housing may include the lamp housing include a retaining device, and the video projector may be kept in the second position by the retaining device. The retaining device may include a tray device which may have a portion which may slide with reference to another portion.

The image projection lighting device may include an access panel that is a component of the lamp housing. The access panel can be positioned in a first state that allows normal operation of the image projection lighting device when the video projector is in the first position in relation to the lamp housing. The access panel can be positioned in a second state so that the video projector can be moved into the second position.

The image projection lighting device may further include a means for moving the video projector into the first position and into the second position. The means for moving the video projector may include a rod and a bushing. The means for moving may include a tray device. The tray device may also be called or may be part of a transversing mechanism.

One or more embodiments of the present invention include a method of preparing a video projector having a video projector housing for operation as a component of an image projection lighting device. The method may include providing a portal in a filter access door that enables a lamp access door to be accessed without first accessing the filter access door.

The present invention in one embodiment provides an improved image projection lighting device. The image projection lighting device of an embodiment of the present invention can be comprised of a base housing, a yoke, and a lamp housing. The base housing may include or have located therein, a processing system and a communications port. The lamp housing may include or have located therein a video projector, an antireflective aperture, a cooling system, and a filter. An image projection lighting device of any of the embodiments of the present invention may include or be combined with any of the features of the image projection lighting devices described in U.S. Pat. No. 6,969,960, inventor Richard S. Belliveau, which is based on U.S. patent application Ser. No. 10/360,185, filed on Feb. 7, 2003, which is incorporated by reference herein.

The video projector may be further comprised of a video projector housing, and a zoom and focus lens having zoom and focus values. The zoom and focus lens may be located, in part, within the video projector housing. One or more motors for controlling zoom and focus values may be located within the video projector housing. Commands received by the communications port of the base housing may be acted upon by the image projection lighting device to change the zoom and focus values of the zoom and focus lens. The zoom and focus values are determined by electronic position signals.

The image projection lighting device may further include a stand alone control device wherein the multicolor video display device operates as a component of the stand alone control device. The communications port may receive commands for controlling a function of the video projector, such as on or off, selecting a video input, control of a lamp mode, color balance, or the speed of a fan which is part of the cooling system.

The image projection lighting device may transmit service information concerning the video projector from the communications port. The service information may concern the speed of the fan, the remaining life of a lamp, or a version of computer software which runs the video projector.

The filter may be washable and/or a fluorocarbon polymer filter. The fan may be located directly behind the filter to pull cooling air into the lamp housing. A speed of the fan may be variably controlled.

DETAILED DESCRIPTION OF THE DRAWINGS

Figure 1:
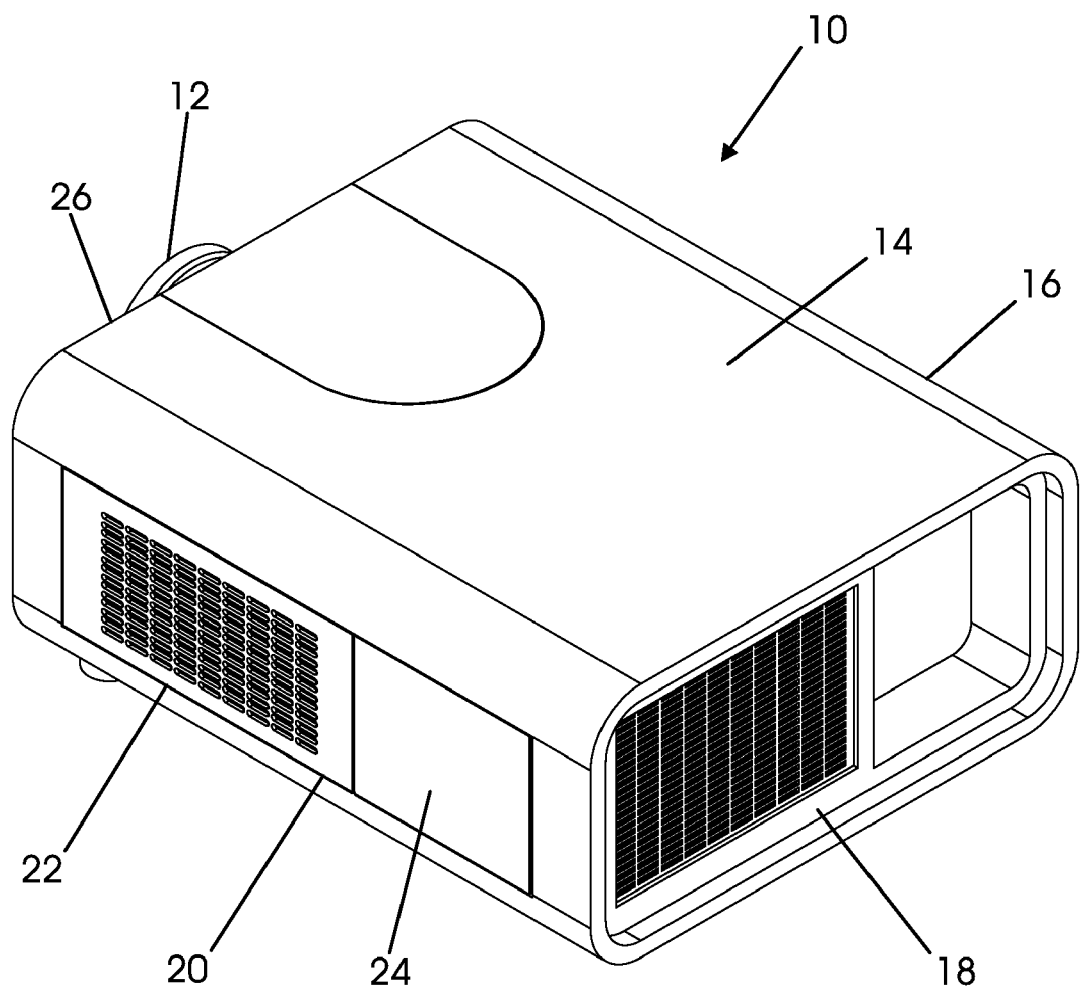
FIG. 1 shows a perspective view of a prior art projector device in a first state in which a filter door and a lamp door are closed.

FIG. 1 shows a perspective view of a prior art projector device 10 in a first state in which a filter door 22 and a lamp door 24 are closed. The projector device 10 may be a Christie (trademarked) LX650—XGA LCD (liquid crystal display) lumen projector made by Christie Digital Systems, Inc. The projector device 10 may have a top 14, rear 18, sides 16, and 20, and front 26. A lens 12 may be located in the front 26, substantially in the middle of the front 26.

Figure 2:
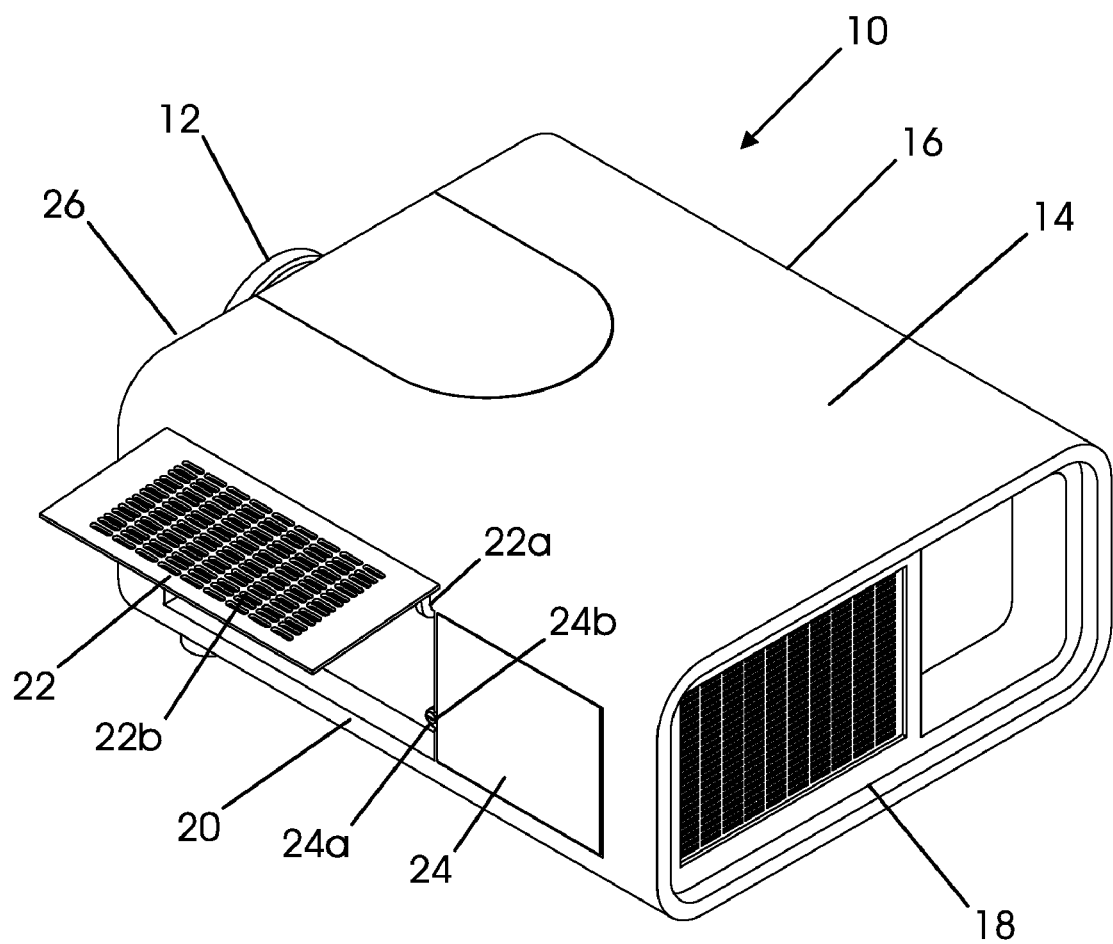
FIG. 2 shows a perspective view of the projector device of FIG. 1 in a second state in which the filter door of the FIG. 1 projector device is open while the lamp door of the FIG. 1 projector device is closed.

FIG. 2 shows a perspective view of the projector device 10 in a second state in which the filter door 22 of the projector device 10 is open while the lamp door 24 of the projector device 10 is closed. The filter door 22 may be hinged to the side 20 or the top 14 by a hinge 22a. The filter door 22 may have slats through which air can pass through the filter door 22 and into a filter, not shown. The filter door 22 when open exposes a screw 24a residing in an opening 24b of the lamp door 24.

Figure 3:
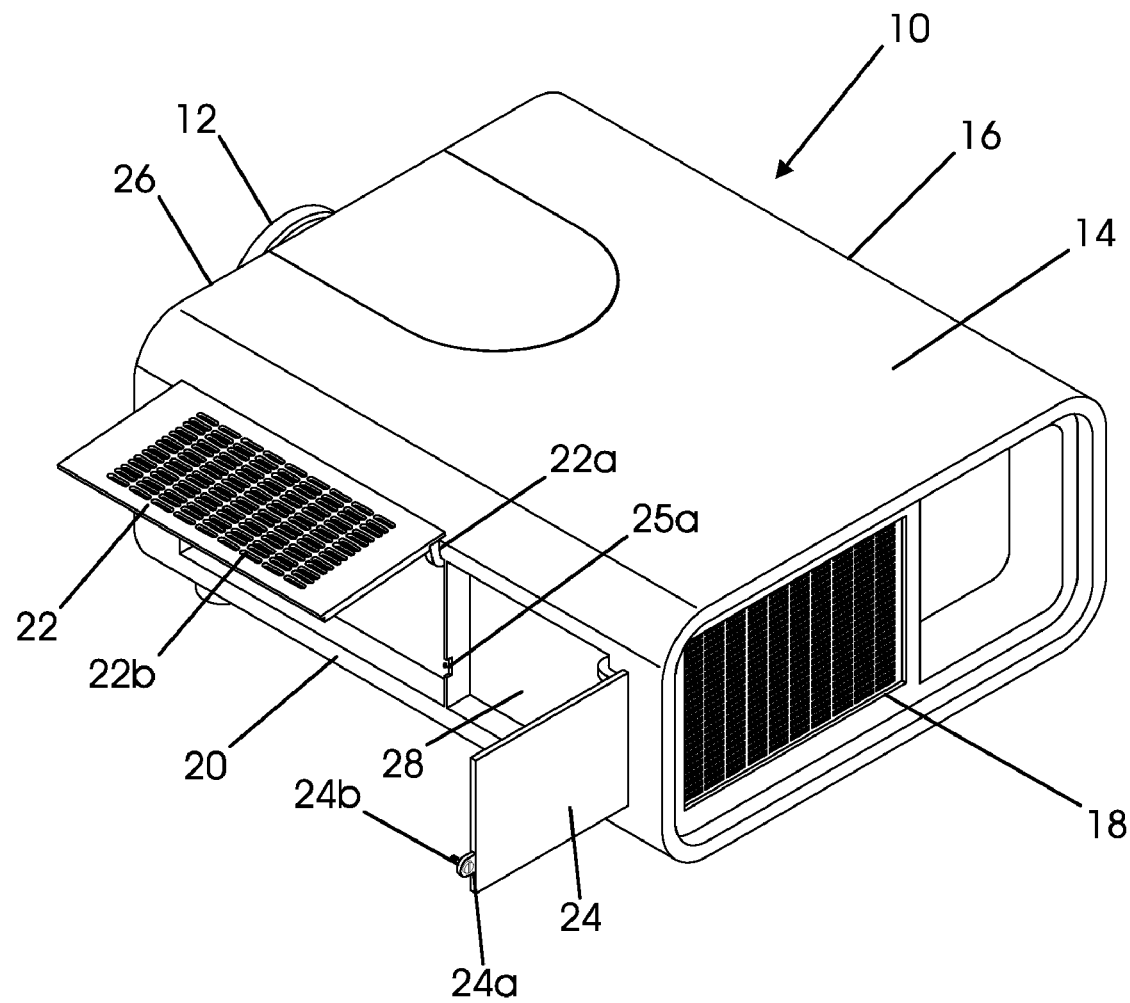
FIG. 3 shows a perspective view of the projector device of FIG. 1 in a third state in which both the filter door and the lamp door of the FIG. 1 projector device are open.

FIG. 3 shows a perspective view of the projector device 10 in a third state in which both the filter door 22 and the lamp door 24 of the FIG. 1 projector device 10 are open. In the FIG. 3 state, the screw 24a has been unscrewed from the typically threaded opening 25a in order to open the lamp door 24. A lamp device 28 lies behind the lamp door 24. The lamp device may include a lamp and a housing or handle to remove the lamp device 28.

Figure 4:
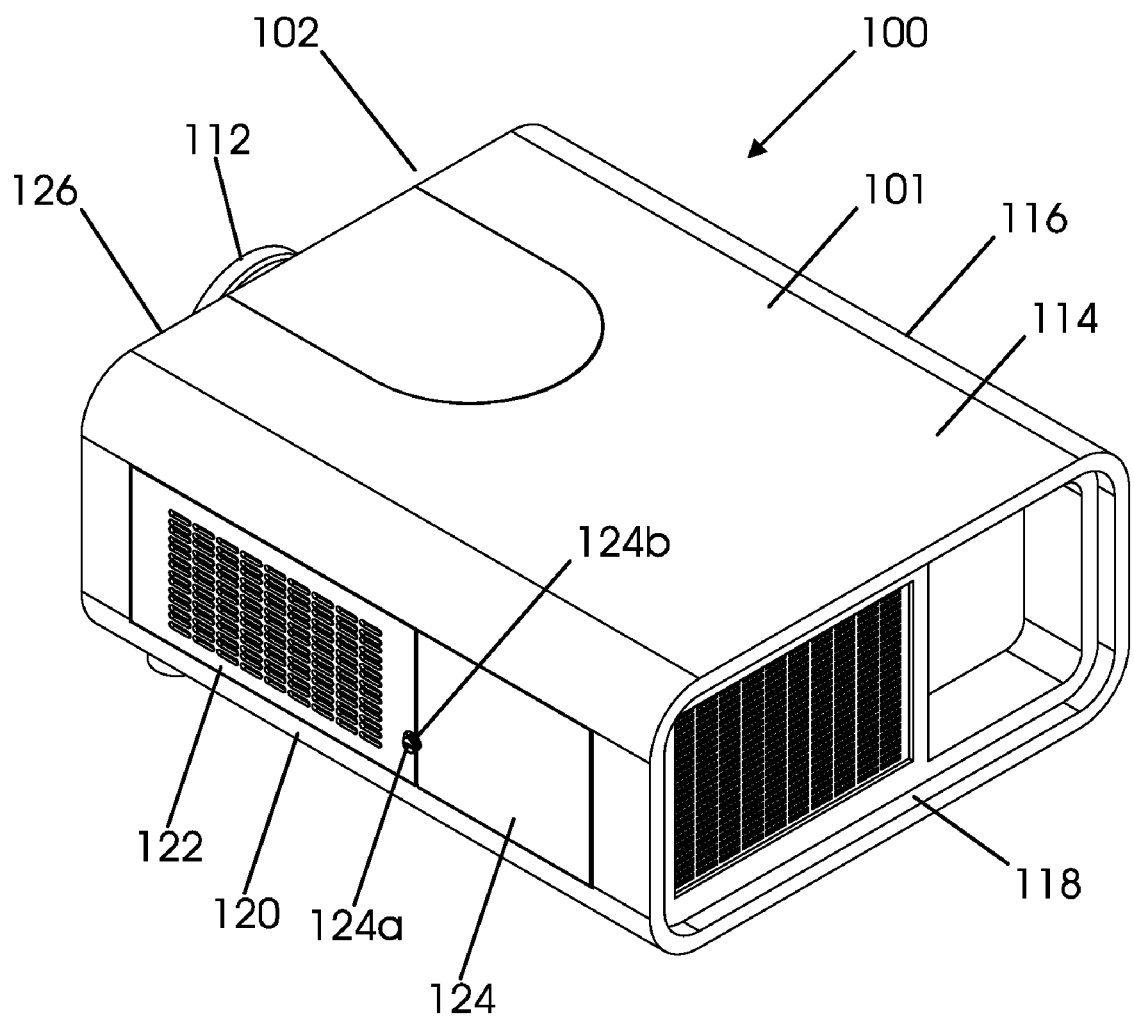
FIG. 4 shows a perspective view of a projector device in accordance with an embodiment of the present invention in a first state in which a filter door and a lamp door are closed.

FIG. 4 shows a perspective view of a projector device, video projector or video projector device 100 in accordance with an embodiment of the present invention in a first state in which a filter door 122 and a lamp door 124 are closed. The projector device 100 may be a Christie (trademarked) LX650 video projector or video projector device which has been modified in accordance with an embodiment of the present invention. The modification allows the lamp door 124 to be opened without opening the filter door 122. The projector device 100 may have a top 114, rear 118, sides 116 and 120, and front 126, which are part of a video projector housing 101. A video projector lens 112 may be located in the front 126, substantially in the middle of the front 126.

Figure 5:
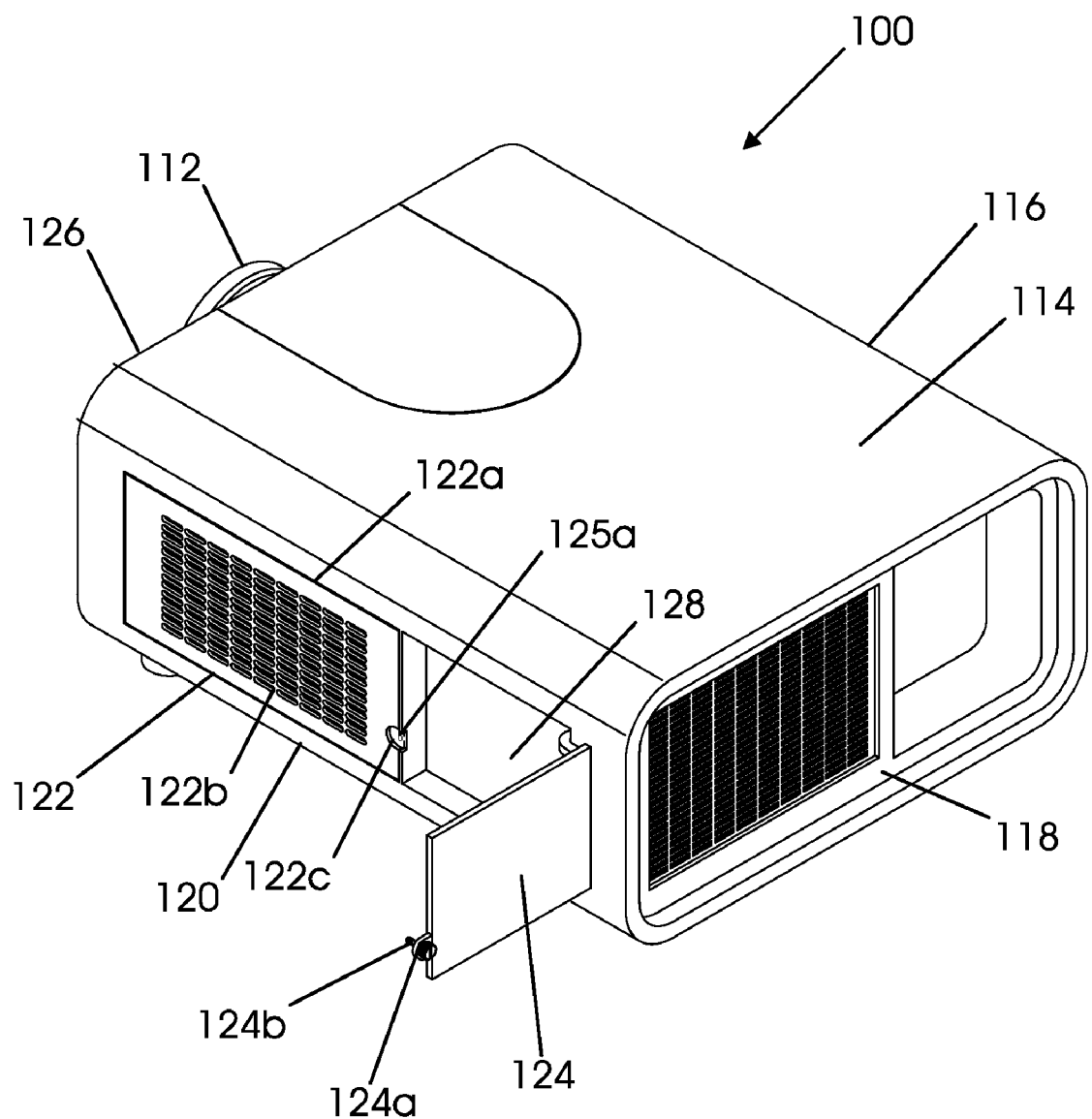
FIG. 5 shows a perspective view of the projector device of FIG. 4 in a second state in which the filter door of the FIG. 4 projector device is closed and the lamp door of the FIG. 4 projector device is open.

FIG. 5 shows a perspective view of the projector device 100 in a second state in which the filter door 122 of the projector device 100 is closed and the lamp door 124 of the FIG. 4 projector device 100 is open, exposing the projector lamp 128. In accordance with an embodiment of the present invention there is a opening or cutout 122c in the filter door 122 which allows a screw 124a to be accessed in order to open the lamp door 124 without opening the filter door 122. The screw 124a can be unscrewed from a threaded opening 125a in order to remove the screw 124a from the threaded opening 125a and to thereby open the lamp door 124, and to remove the projector lamp 128.

Figure 6:
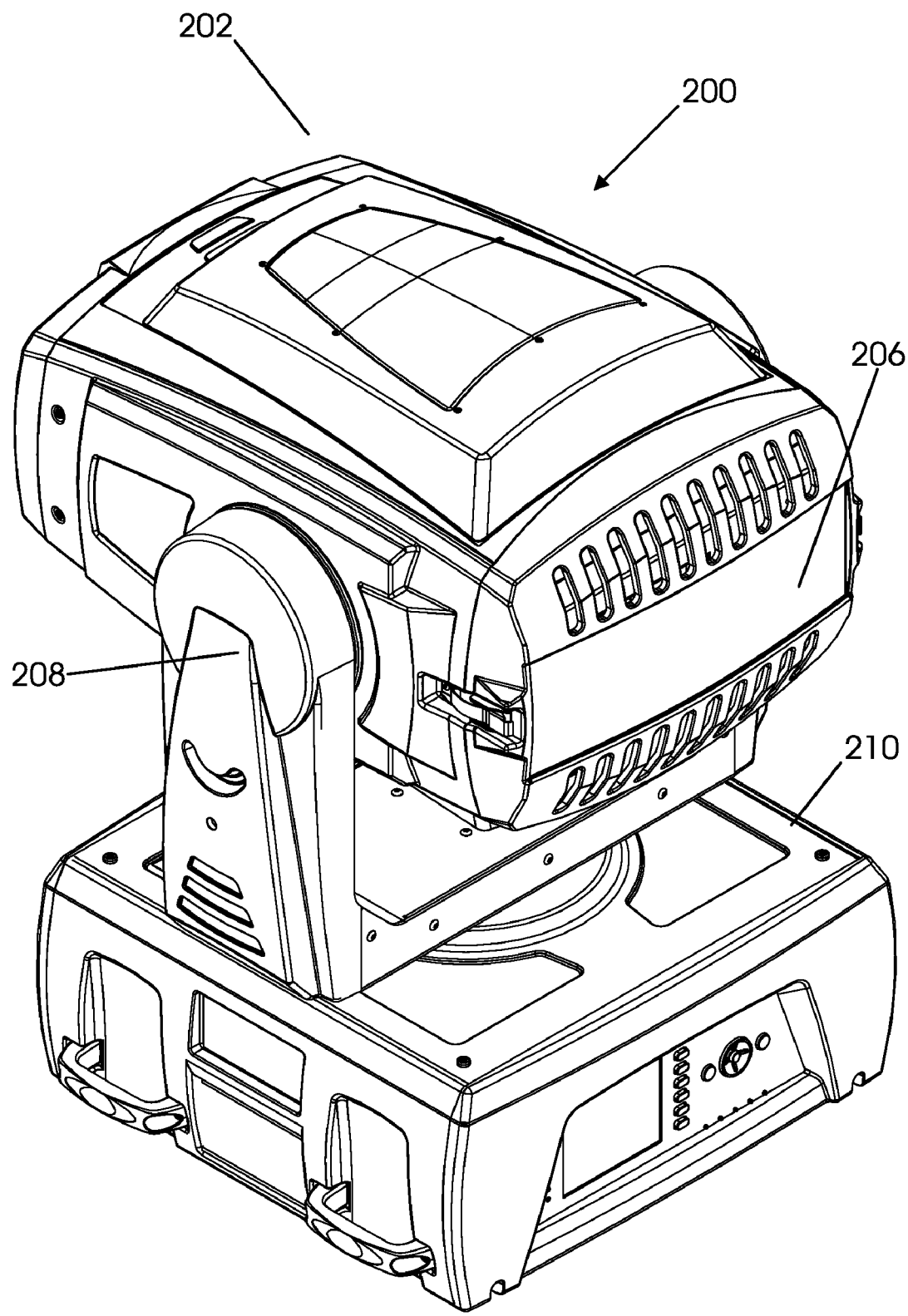
FIG. 6 shows a perspective view of a multiparameter lighting device in accordance with an embodiment of the present invention.

FIG. 6 shows a perspective view of a multiparameter lighting device 200 in accordance with an embodiment of the present invention. The multiparameter lighting device 200 may include a lamp housing 202, a lamp housing back cover or access panel 206, a yoke 208, and a base housing 210. The lamp housing 202 may be pivot with respect to the yoke 208. The yoke 208 may pivot with respect to the base housing 210 in a manner known in the art. A filter, such as a hepa filter is located in the lamp housing 202 of the multiparameter lighting device 200 near the top surface 203. The filter in the lamp housing 202 is in addition to, and renders unnecessary, any filter that may reside in the projector device 100. Thus if there is a filter in the projector device 100, it does not need to be replaced or accessed in any way.

Figure 7:
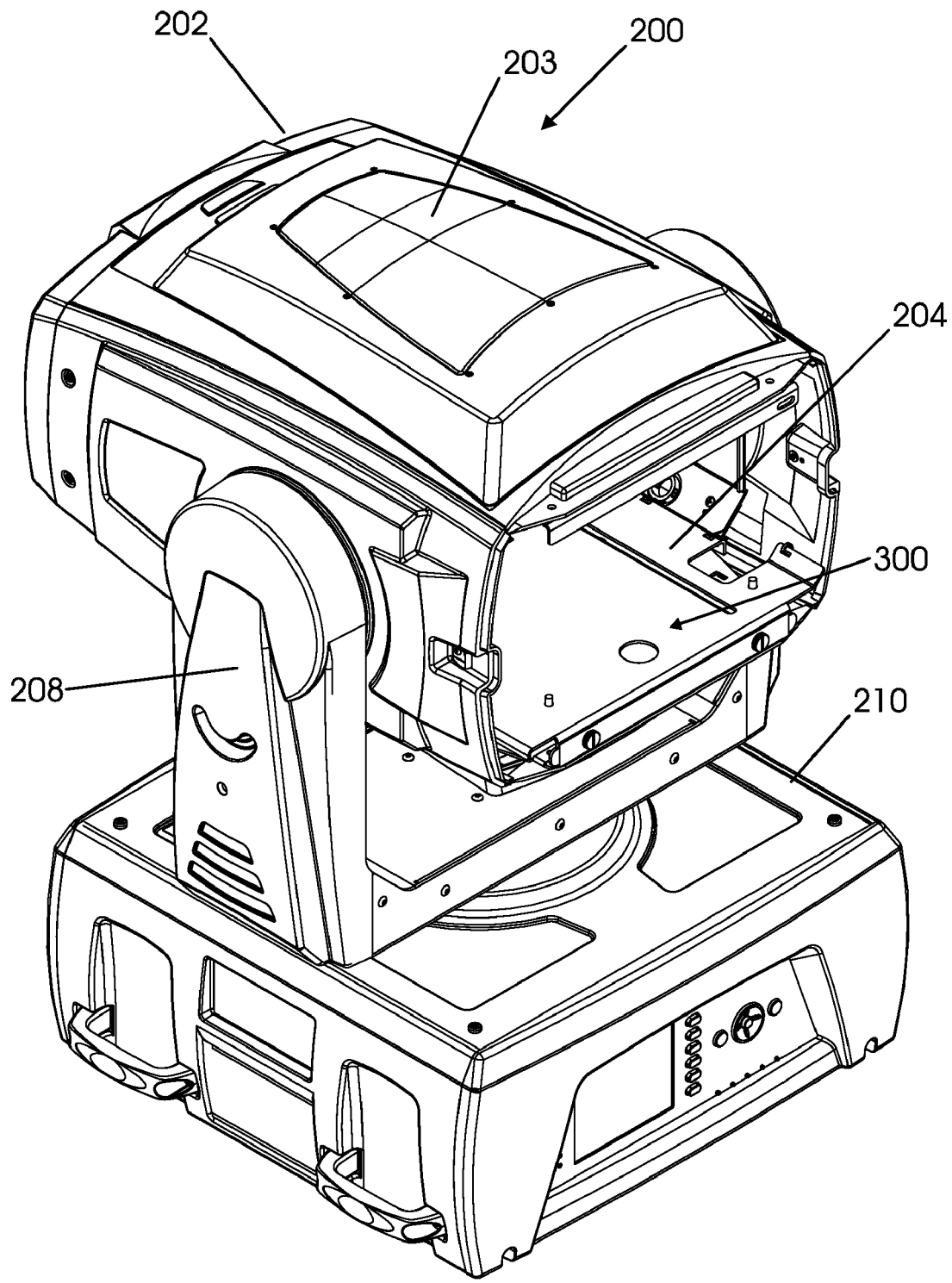
FIG. 7 shows a perspective view of the multiparameter lighting device of FIG. 6 with a back cover removed, so that a tray device can be seen.
Figure 8:
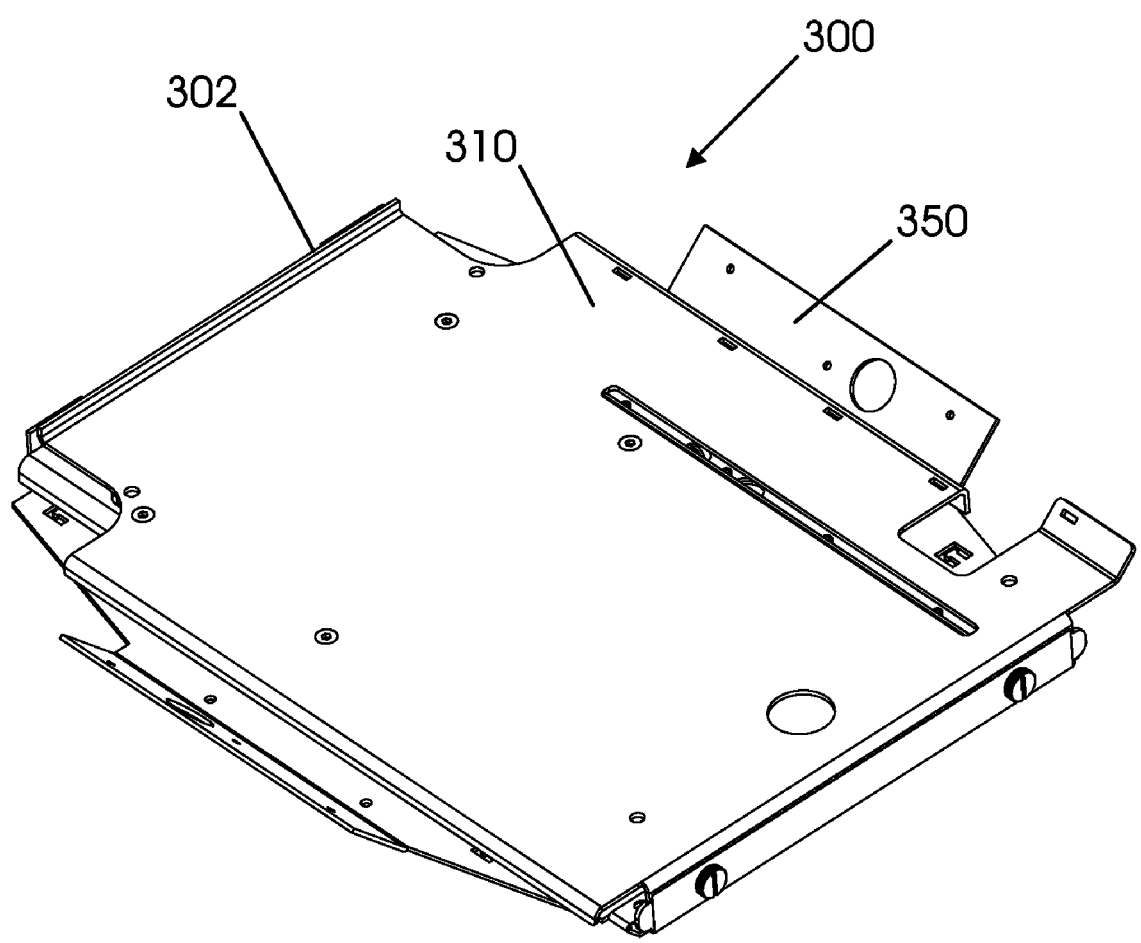
FIG. 8 shows a perspective view of the tray device for use in the multiparameter lighting device of FIG. 6, with the tray device in a closed state.

FIG. 7 shows a perspective view of the multiparameter lighting device 200 of FIG. 6 with the back cover 206 removed, so that a tray device 300 can be seen. FIG. 8 shows a perspective view of the tray device 300 for use in the multiparameter lighting device 200 of FIG. 6, with the tray device 300 in a closed state. The tray device 300 includes a top portion 310 and a base portion 350. The tray device 300 may be called or may be part of a transversing mechanism.

Figure 9:
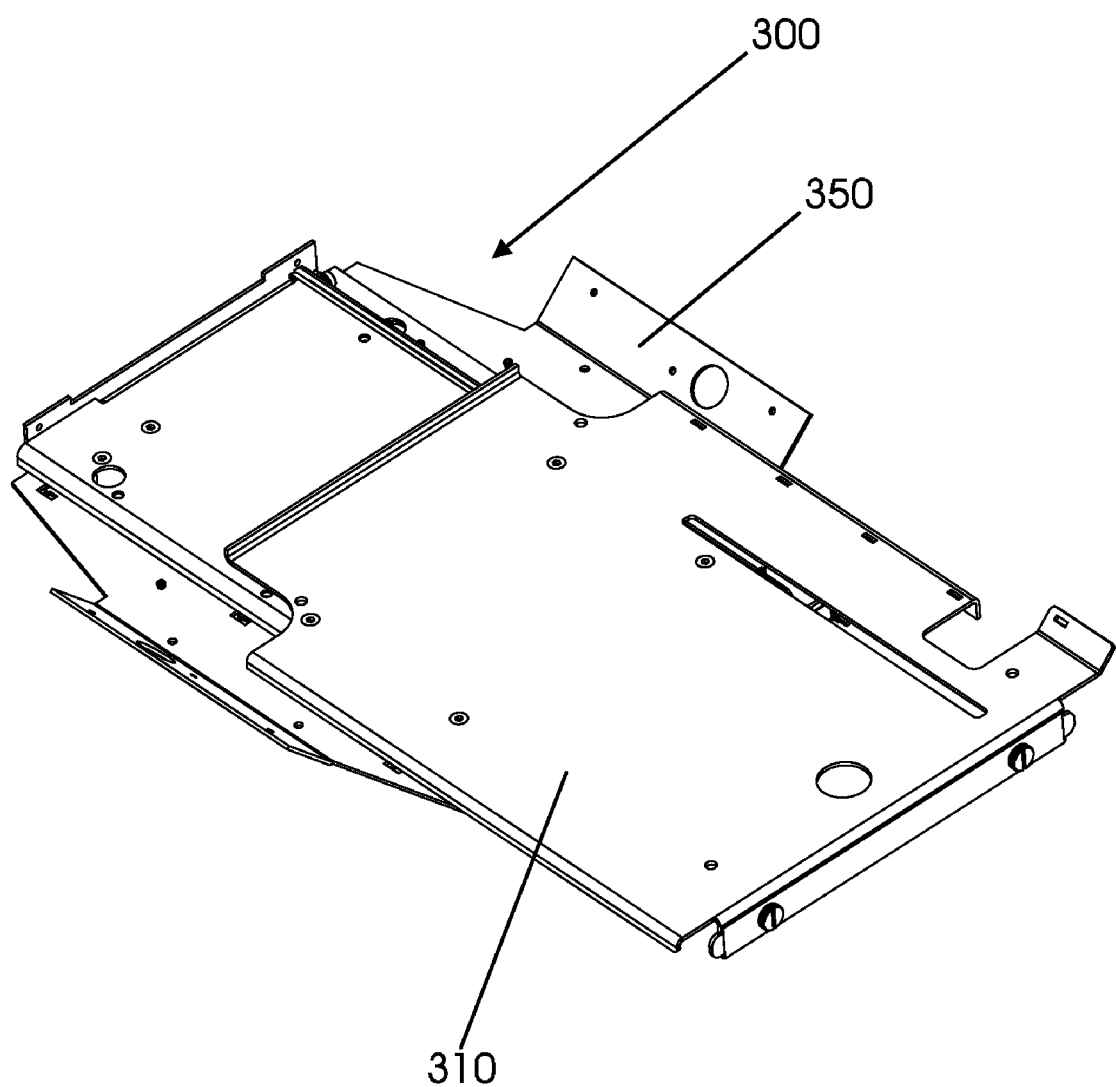
FIG. 9 shows a perspective view of the tray device for use in the multiparameter lighting device of FIG. 6, with the tray device in a open state.
Figure 13:
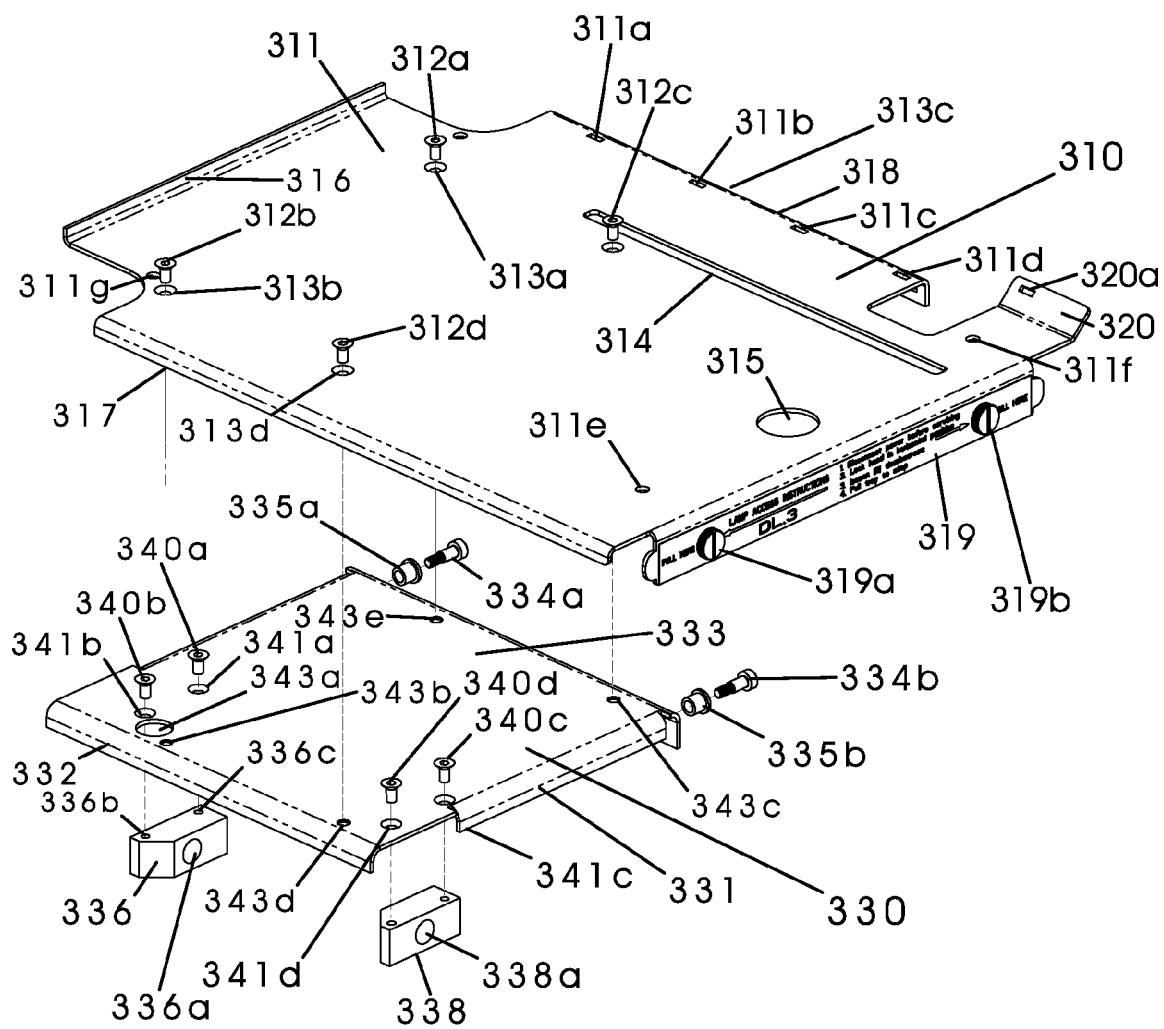
FIG. 13 shows a perspective view of the first portion and a third portion of the tray device of FIG. 7.
Figure 14:
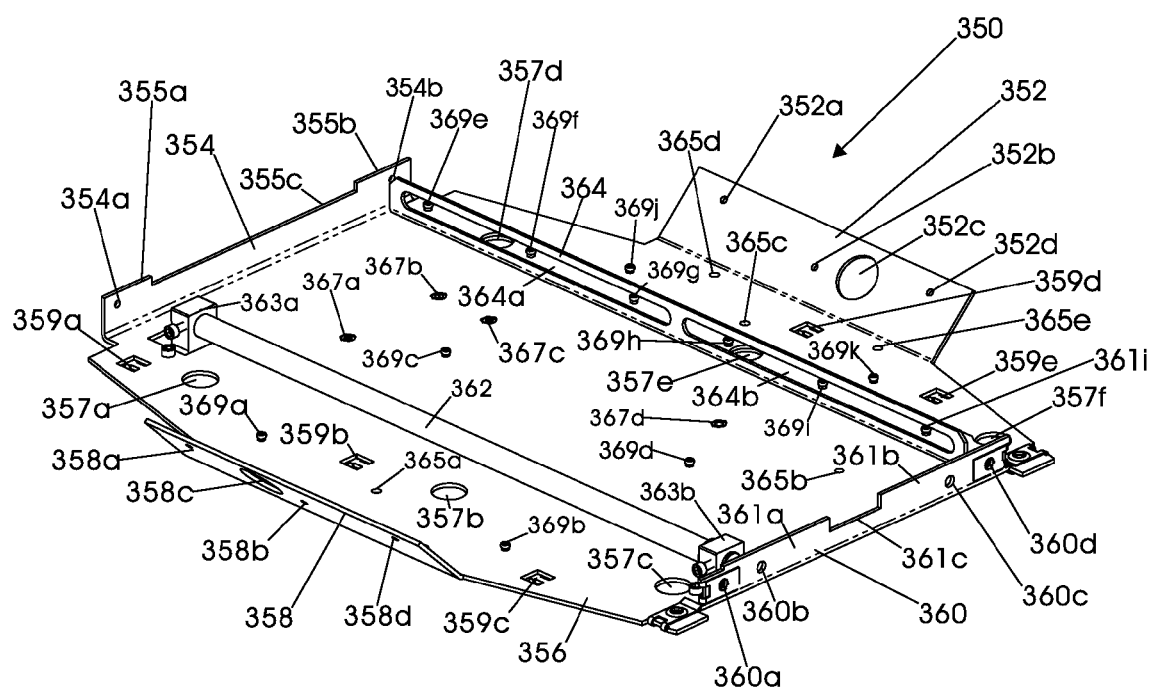
FIG. 14 shows a perspective view of the second portion of the tray device of FIG. 7.

FIG. 9 shows a perspective view of the tray device 300 for use in the multiparameter lighting device 200 with the tray device 300 in a open state. In the open state, the top portion 310 of the tray device 300 has been slid forward with respect to the base portion 350 of the tray device 300. FIG. 13 shows a perspective view of details regarding the top portion 310 and a portion 330 of the tray device 300. FIG. 14 shows a perspective view of details regarding the base portion 350 of the tray device 300.

Figure 10:
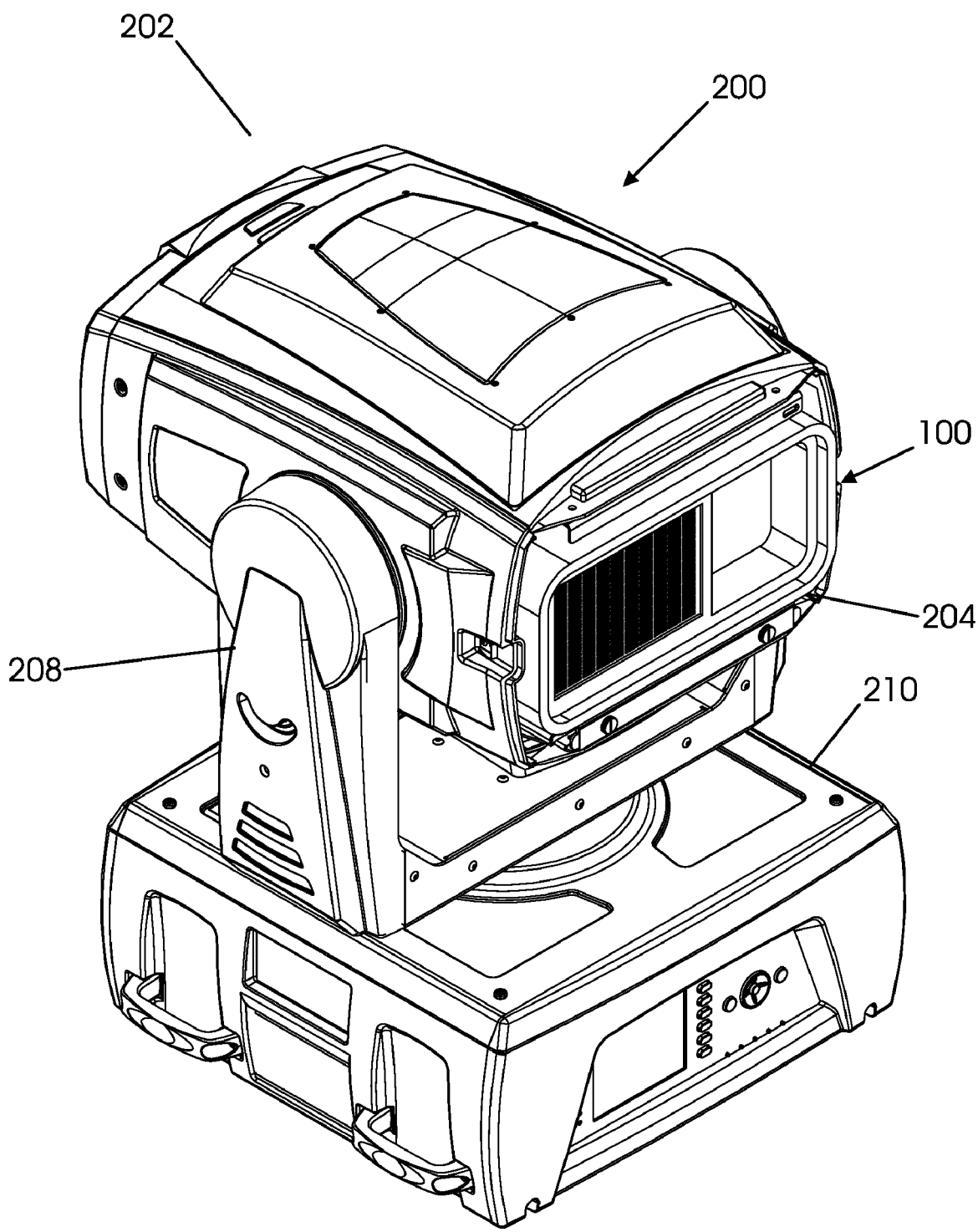
FIG. 10 shows a perspective view of the multiparameter lighting device of FIG. 6, with the back cover removed and with the projector device of FIG. 4 fully inserted into a chamber of the multiparameter lighting device.

FIG. 10 shows a perspective view of the multiparameter lighting device 200 with the back cover 206 removed and with the projector device 100 fully inserted into a chamber 204 of the multiparameter lighting device 200. The projector device 100 or video projector device 100 may be described as being part of the multiparameter lighting device or image projection lighting device 200, in one or more embodiments of the present invention.

Figure 11:
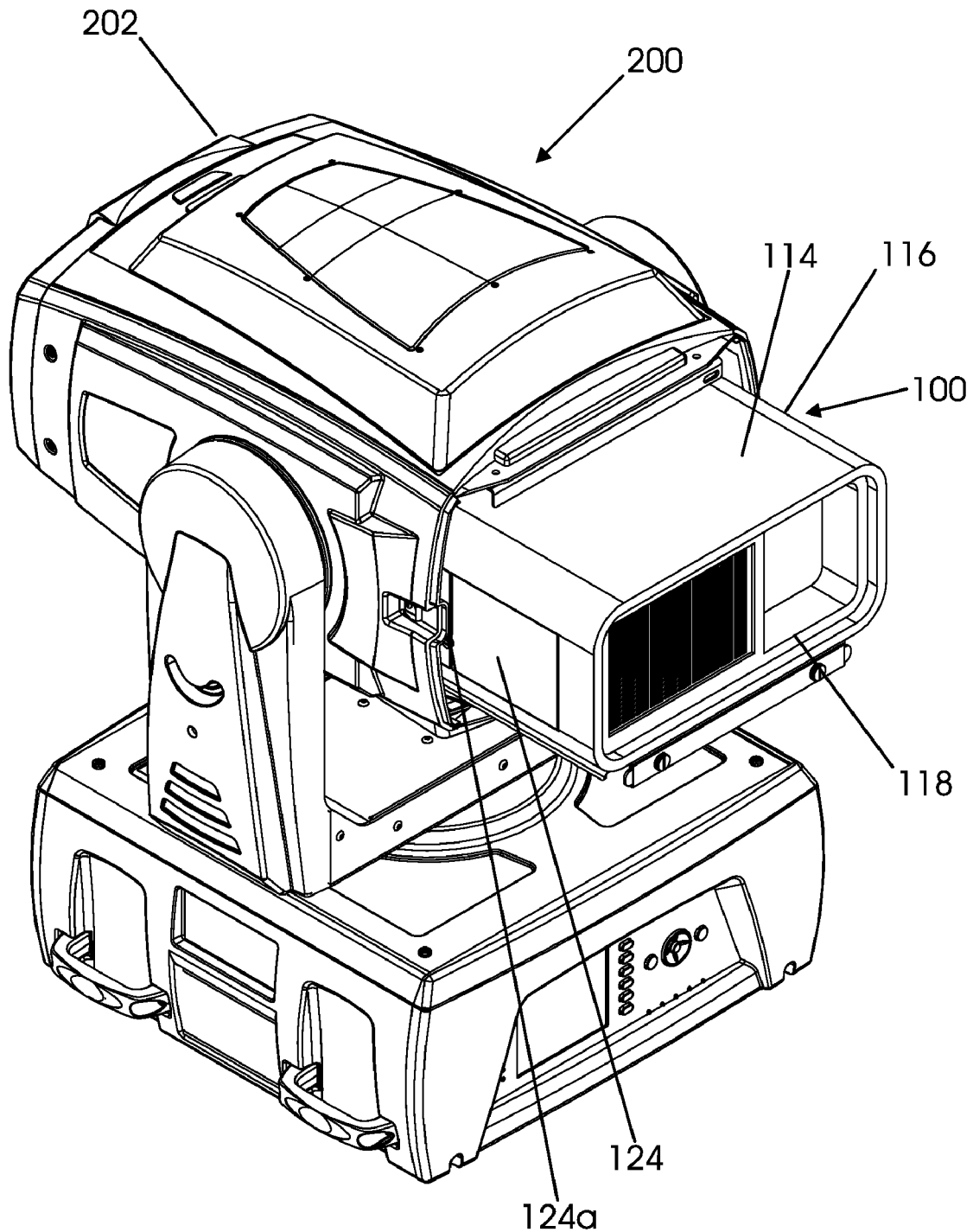
FIG. 11 shows a perspective view of the multiparameter lighting device of FIG. 6 with the back cover removed and with the projector device of FIG. 4 partially removed from the chamber of the multiparameter lighting device by sliding the first portion of the tray device with respect to the second portion of the tray device.

FIG. 11 shows a perspective view of the multiparameter lighting device 200 with the back cover 206 removed and with the projector device 100 partially removed from the chamber 204 of the multiparameter lighting device 200 by sliding the top or first portion 310 of the tray device 300 with respect to the second portion 350 of the tray device 300. In the shown in FIG. 11, the screw 124a of the lamp door 124 can be accessed and the lamp door 124 can be opened in order to remove a projector lamp from the projector device 100. The projector device 100 sits on the top or first portion 310 of the tray device 300 and is supported thereby. The tray device 300 cannot be slid out more than is shown in FIG. 11, because it is mechanically limited in travel by the guide bushing rail 364.

Figure 12:
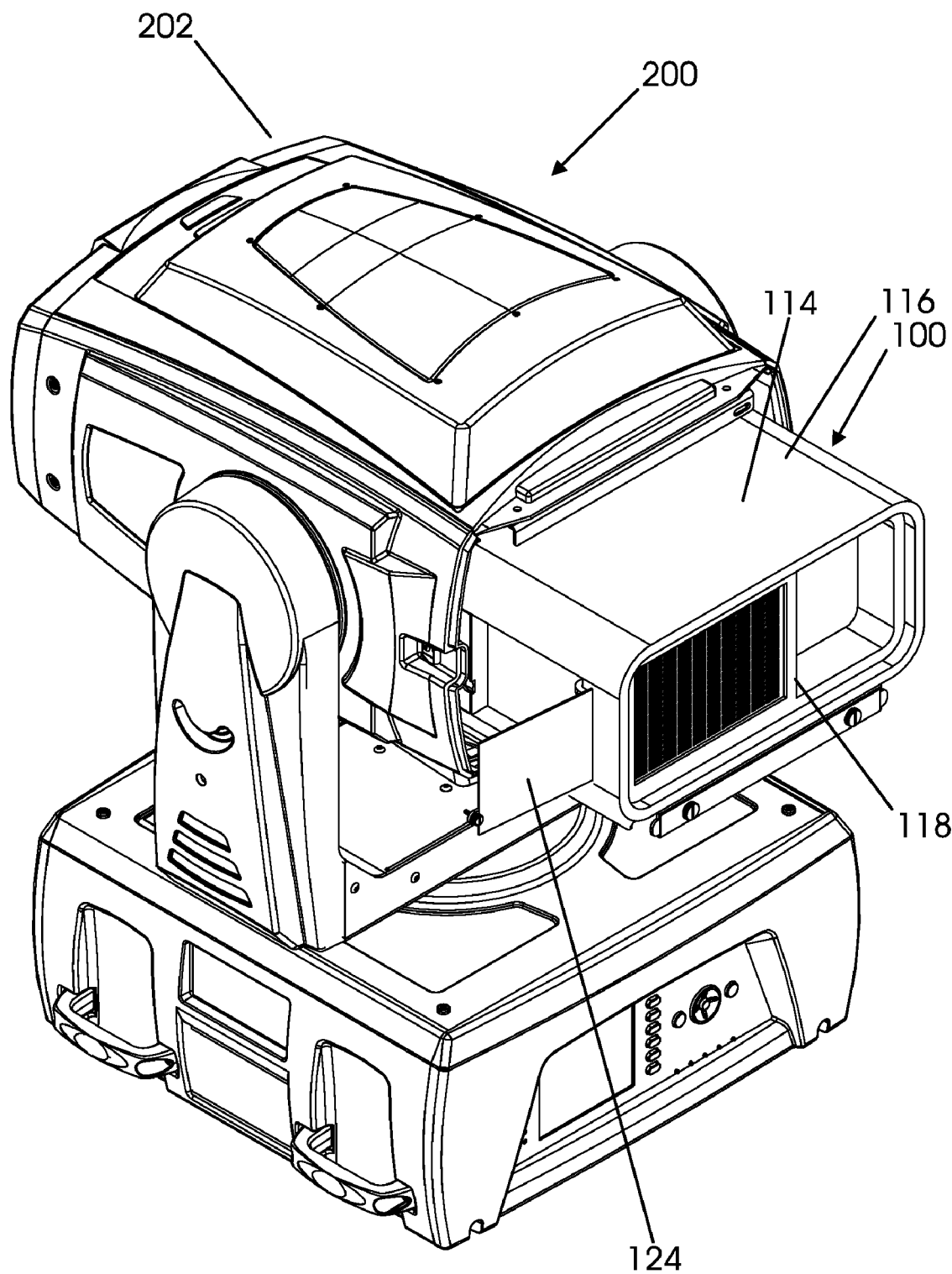
FIG. 12 shows a perspective view of the multiparameter lighting device of FIG. 6 with the back cover removed and with the projector device of FIG. 4 partially removed from the chamber of the multiparameter lighting device by sliding the first portion of the tray device with respect to the second portion of the tray device, and with a lamp door of the projector device of FIG. 4 open.

FIG. 12 shows a perspective view of the multiparameter lighting device 200 with the back cover 206 removed and with the projector device 100 partially removed from the chamber 204 of the multiparameter lighting device 200 by sliding the first portion 310 of the tray device 300 with respect to the second portion 350 of the tray device 300, and with the lamp door 124 of the projector device 100 open.

FIG. 13 shows a perspective view of the first portion 310 and a third portion 330 of the tray device 300. The first portion 310 may be called a projector mounting plate assembly. The third portion 330 may be called a projector mount slide plate assembly. The first portion 310 includes upwardly extending flanges 316 and 320 and downwardly extending flanges 317, 318, and 319, which extend from a plate 311. The purpose of these are for structural integrity.

The plate 311 has a large circular opening 315 which is a clearance hole for a tilt adjustment knob that is a feature of an original equipment manufacturer ("OEM") projector device which can be used for or as part of the projector device 100, a plurality of smaller circular openings 313a-d for connecting the projector mounting plate 310 to the projector mount slide plate 330, a plurality of further circular openings 311e-g for connecting the projector device 100 to the projector mounting plate or first portion 310, and a plurality of rectangular openings 311a-311d for securing a wiring harness assembly (not shown) along the length of the projector mounting plate 310 using plastic zip tie wraps to prevent damage to the harness during servicing. The flange 320 has a rectangular opening 320a and is the wiring harness tie wrap securing location for a wire harness service loop not shown. A data wiring harness which connects to terminals on the rear of the projector device 100 is "dressed" along the side of the first portion or plate 310 and secured using plastic zip tie wraps at locations 311a,b,c & d. This protects the data wiring harness and allows the harness to move with the slide plate 330.

Screws 312a, 312b, 312c, and 312d can be inserted into openings 313a-313d, respectively to fix the first portion 310 to the third portion 330. The plate 311 also has an elongated slot 314 to allow clearance between the projector mounting plate 310 and the guide busing rail 364. The flange 319 has screws 319a and 319b inserted through it in order to secure the tray device 300 to the second portion 350 at location 360a and 360d. The flange 319 has various printed instructions shown which are to direct the servicing technician the steps necessary to unlock the projector tray assembly 300 from the second portion 350 and allow the projector assembly 100 to slide out of the fixture housing.

The third portion 330 includes downwardly extending flanges 331, 332a, and 332b, which extend from a plate 333 which are for structural integrity. The plate 333 has openings 341a-d through which screws 340a-d, can be inserted respectively. The screws 340a and 340b, are inserted into the projector mount slide bushing 336, while the screws 340c and 340d are inserted into the projector mount slide bushing 338. The members 336 and 338 have substantially central large openings 336a and 338a, respectively, through which the linear slide shaft 362 of FIG. 14 can be inserted to allow the third portion 330 to slide relative to the second portion 350.

Screws 334a and 334b, and corresponding bushings 335a and 335b are used to secure the projector mount guide bushings 335a and 335b to the projector mount slide plate 330. Bushings 335a and 335b may be called projector mount guide bushings. The third portion 330 also has a large circular opening 343a which is a clearance hole to access the hardware to mount the projector 100 through mounting hole 311g and small circular openings 343b-343e containing PEM (trademark) threaded inserts, through which screws 312b, 312d, 312c, and 312a, respectively, are inserted to secure the third portion 330 to the first portion 310.

FIG. 14 shows a perspective view of the second portion 350 of the tray device 300. The second portion 350 may be called a fixture head slide plate assembly. The second portion 350 includes slanted flanges 352 and 358, and upwardly extending flanges 354 and 360 extending from plate 356. The second portion 350 further includes a slide bushing linear shaft or rod 362, and guide bushing rail 364. The guide bushing rail 364 has slots 364a and 364b. The linear shaft or rod 362 is attached to the plate 356 at a first end by device 363a and at a second end by device 363b The devices 363a and 363b are mounted to the plate 356.

The slanted flange 352 has a large circular opening 352c, and smaller circular openings 352a, 352b, and 352c which are for hardware clearance hole locations to secure the second portion 350 to the structural framework that makes up the fixture head or multiparameter lighting device 200. Similarly, the slanted flange 358 has a large circular opening 358c and smaller circular openings 358a, 358b, and 358c which are for mounting a front bezel 202 of the fixture head or multiparameter lighting device 200. The upwardly extending flange 354 has outer sections 355a and 355b, and central indented section 355c, which is mechanical clearances to the front bezel 202. Sections 355a and 355b have circular openings 354a and 354b, respectively for rivets. The upwardly extending flange 360 has outer sections 361a and 361b and central indented section 361c, which are for mechanical clearances. Threaded clips, such as Tinnerman (trademarked) threaded clips 360a and 360d, are inserted into sections 361a and 361b, respectively, for mating to the projector slide assembly 310 hardware 319a and 319b. The sections 361a and 361b also have openings 360b and 360c, respectively which are clearance holes for alignment guide pins (not shown, located behind downward flange 319) to center the plate assembly or first portion 310 when it is seated and secured to the plate 350 with screws 319a and 319b.

The plate 356 has large circular openings 357a, 357b, 357c, 357d, 357e, and 357f, which are to allow access to the mounting screws that secure the projector 100 to the plate assembly 310 at locations 311e, 311f, 311g and the fourth hole which is not labeled. The plate 356 also has U-shaped members 359a, 359b, 359c, 359d, and 359e, which are for wire harness tie wrap securing locations. Protrusions 369a, 369b, 369c, 369d, 369e, 369f, 369g, 369h, 369i, 369j, and 369k are also provided attached to plate 356 are rivets that attach two horizontal support ribs (not shown) underneath the plate assy. 350 and are for structural integrity. Plate 356 also includes a plurality of smaller circular openings 365a, 365b, 365c, 365d, and 365e, which are hardware clearance holes for screws that mount the plate assembly 350 to fixture head framework of the multiparameter lighting device 200.

Figure 15:
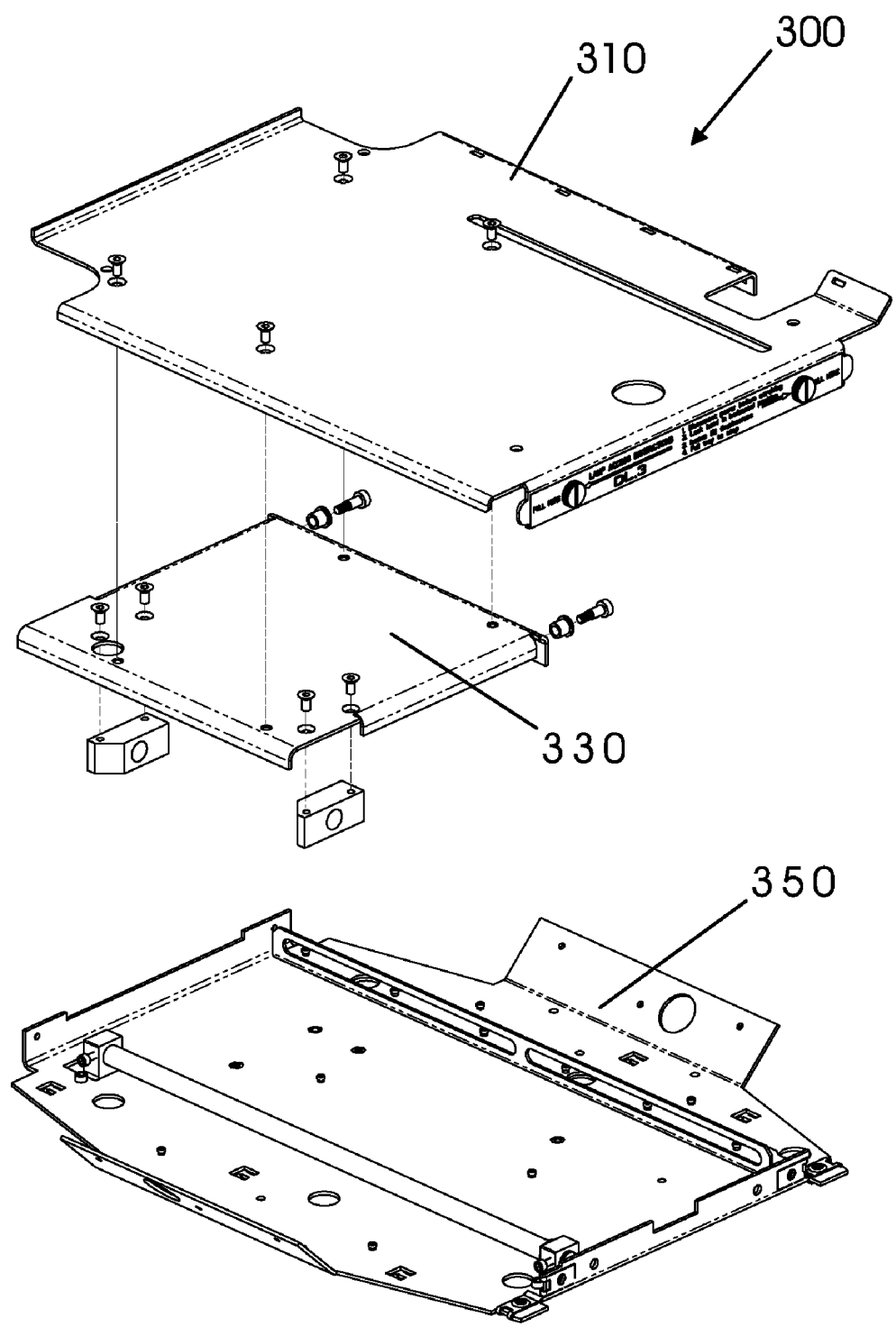
FIG. 15 shows a perspective view of first, second, and third portions of the tray device of FIG. 7 taken apart.

FIG. 15 shows a perspective view of the portions 310, 330, and 350 of the tray device 300, taken apart. In operation, the projector mount slide bushings 336 and 338 slide on the slide bushing linear shaft or rod 362, with the rod 362 inserted into the openings 336a and 338a of the bushings 336 and 338, respectively. At the same time, the projector mount guide bushings 335a and 335b slide in the slots 364a and 364b, respectively, of the guide bushing rail 364. The projector mounting guide bushing 335a and the dividing member 364c (which divides slots 364a and 364b) prevents the projector slide plate or portion 330 from sliding more than about halfway with respect to the fixture head slide plate assembly or second portion 350. The first portion or projector mounting plate assembly 310 which is fixed to the projector mount slide plate, is also thereby allowed to slide only halfway with respect to the fixture head slide plate assembly or second portion 350.

We claim:

1. An image projection lighting device comprising a base housing;
   a yoke;
   a lamp housing;
   a video projector located inside the lamp housing, wherein the video projector has dimensions while located inside the lamp housing;
   a support device connected to the lamp housing, wherein the support device has a portion which supports the video projector, and which is configured to be moved to move the video projector from a first position in relation to the lamp housing to a second position in relation to the lamp housing which differs from the first position, wherein the support device is connected to the lamp housing when the video projector is in the first position and when the video projector is in the second position, and wherein the portion of the support device supports the video projector in both the first position and in the second position;
   wherein the lamp housing is remotely positioned in relation to the base housing by a motor;
   wherein the video projector is comprised of a video projector housing, a projector lens, a projector lamp, and a first light valve;
   wherein the first position is a video projector operating position and the video projector cannot be serviced in the video projector operating position;
   wherein the video projector can be serviced in the second position;
   wherein the support device is configured so that the portion of the support device can be moved to move the video projector from the first position to the second position without substantially changing the dimensions of the video projector;
   wherein when the video projector is in the first position, an access portion of the video projector is not exposed so that the access portion cannot be opened to remove a component used in image projection from inside the video projector; and
   wherein the movement of the portion of the support device, which moves the video projector from the first position to the second position, causes the access portion of the video projector to become exposed, so that the access portion can be opened, while the support device remains connected to the lamp housing and while the video projector remains in the second position and remains supported by the portion of the support device in the second position, to remove a component used in image projection from inside the video projector.

2. The image projection lighting device of claim 1 wherein the lamp housing includes a retaining device;
   and wherein the video projector is kept in the second position by the retaining device.

3. The image projection lighting device of claim 1 wherein the access portion includes a means for accessing the projector lamp;
   wherein in the first position the means for accessing the projector lamp cannot be opened so that, in the first position, the projector lamp cannot be removed by opening the means for accessing the projector lamp; and wherein in the second position the means for accessing the projector lamp can be opened so that, in the second position, the projector lamp can be removed by opening the means for accessing the projector lamp.

4. The image projection lighting device of claim 1 wherein the support device is comprised of a rod and a bushing.

5. The image projection lighting device of claim 1 further comprising an access panel that is a component of the lamp housing; and wherein the access panel can be positioned in a first state that allows normal operation of the image projection lighting device when the video projector is in the first position in relation to the lamp housing; and wherein the access panel can be positioned in a second state so that the video projector can be moved into the second position.

6. An image projection lighting device comprising a base housing;

a yoke;

a lamp housing;

a video projector located inside the lamp housing, wherein the video projector has dimensions while located inside the lamp housing;

a support device connected to the lamp housing, wherein the support device has a portion which supports the video projector, and which is configured to be moved to move the video projector from a first position in relation to the lamp housing to a second position in relation to the lamp housing which differs from the first position, wherein the support device is connected to the lamp housing when the video projector is in the first position and when the video projector is in the second position, and wherein the portion of the support device supports the video projector in both the first position and in the second position;

wherein the lamp housing is remotely positioned in relation to the base housing by a motor;

wherein the video projector is comprised of a video projector housing, a projector lens, a projector lamp, and a first light valve;

wherein the first position is a video projector operating position and the projector lamp cannot be accessed in the video projector operating position;

wherein the projector lamp can be accessed in the second position;

wherein the support device is configured so that the portion of the support device can be moved to move the video projector from the first position to the second position without substantially changing the dimensions of the video projector;

wherein when the video projector is in the first position, an access portion of the video projector is not exposed so that the access portion cannot be opened to remove the projector lamp used in image projection from inside the video projector; and wherein the movement of the portion of the support device, which moves the video projector from the first position to the second position, causes the access portion of the video projector to become exposed, so that the access portion can be opened, while the support device remains connected to the lamp housing and while the video projector remains in the second position and remains supported by the portion of the support device in the second position, to remove the projector lamp used in image projection from inside the video projector.

7. The image projection lighting device of claim 6 further comprising an access panel that is a component of the lamp housing;

wherein the access panel can be positioned in first state that allows normal operation of the image projection lighting device when the video projector is in the first position in relation to the lamp housing;

and wherein the access panel can be positioned in a second state so that the video projector can be moved into the second position.

8. An image projection lighting device comprising:

a base housing;

a yoke; and a lamp housing, wherein the lamp housing is remotely positioned in relation to the base housing by a motor;

the lamp housing comprising a video projector, wherein the video projector has dimensions while located inside the lamp housing;

the video projector comprising a video projector housing, a projector lens, a projector lamp and a first light valve; and further comprising a support device connected to the lamp housing, wherein the support device has a portion which supports the video projector, and which is configured to be moved to move the video projector from a first position in relation to the lamp housing to a second position in relation to the lamp housing which differs from the first position, wherein the support device is connected to the lamp housing when the video projector is in the first position and when the video projector is in the second position, and wherein the portion of the support device supports the video projector in both the first position and in the second position;

wherein the video projector housing is substantially retained in the first position in relation to the lamp housing for normal operation of the image projection lighting device;

wherein the second position allows for access for servicing the projector lamp; and wherein the support device is configured so that the portion of the support device can be moved to move the video projector from the first position to the second position without substantially changing the dimensions of the video projector;

wherein when the video projector is in the first position, an access portion of the video projector is not exposed so that the access portion cannot be opened to remove a component used in image projection from inside the video projector; and wherein the movement of the portion of the support device, which moves the video projector from the first position to the second position, causes the access portion of the video projector to become exposed, so that the access portion can be opened, while the support device remains connected to the lamp housing and while the video projector remains in the second position and remains supported by the portion of the support device in the second position, to remove a component used in image projection from inside the video projector.

9. The image projection lighting device of claim 8 further comprising an access door that is a component of the lamp housing; and wherein the access door is removed to allow the video projector to be moved to the second position.

10. The image projection lighting device of claim 8 wherein the access portion of the video projector includes a projector lamp access door that is a component of the projector housing; and wherein the projector lamp access door can be opened only after moving the video projector housing to the second position;

and wherein the projector lamp access door, when opened, allows removal of the projector lamp from the video projector.

* * * * *